(12) United States Patent
Taxon

(10) Patent No.: US 6,940,401 B2
(45) Date of Patent: Sep. 6, 2005

(54) CUSTOMIZABLE LOW FUEL INDICATOR SYSTEM

(75) Inventor: Morse N Taxon, Oak Park, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 173 days.

(21) Appl. No.: 10/655,784

(22) Filed: Sep. 5, 2003

(65) Prior Publication Data

US 2005/0062593 A1 Mar. 24, 2005

(51) Int. Cl.⁷ .................................................. B60Q 1/00
(52) U.S. Cl. .................... 340/450.2; 340/450; 701/123; 73/113
(58) Field of Search ............................. 340/450.2, 450, 340/439; 701/123, 99; 73/113, 114

(56) References Cited

U.S. PATENT DOCUMENTS

| | | | | |
|---|---|---|---|---|
| 4,706,083 A | * | 11/1987 | Baatz et al. ................. | 701/123 |
| 5,578,748 A | * | 11/1996 | Brehob et al. ................. | 73/114 |
| 5,693,876 A | * | 12/1997 | Ghitea et al. .................. | 73/114 |
| 5,866,797 A | * | 2/1999 | Swanson ..................... | 73/1.88 |
| 6,038,917 A | * | 3/2000 | Sember ........................ | 73/114 |
| 6,092,021 A | * | 7/2000 | Ehlbeck et al. ............. | 701/123 |

* cited by examiner

*Primary Examiner*—Toan N. Pham
(74) *Attorney, Agent, or Firm*—Ralph E. Smith

(57) ABSTRACT

A customizable low fuel indicator system for a motor vehicle having an engine control unit storing the average fuel economy of the motor vehicle. A fuel tank sensor is in electronic communication with the engine control unit and is adapted to sense the amount of fuel remaining in a fuel tank of the motor vehicle. An indicator is in electronic communication with the engine control unit. An input device is in communication with the electronic control unit for selecting a threshold distance to empty. The engine control unit calculates a distance to empty value based on the average fuel economy and the amount of fuel sensed by the fuel tank sensor. The indicator is activated by the engine control unit when the distance to empty is less than the threshold distance to empty.

9 Claims, 2 Drawing Sheets

CUSTOMIZABLE LOW FUEL INDICATOR SYSTEM

FIELD OF THE INVENTION

The present invention relates to a low fuel indicator system and more particularly to a low fuel indicator system that is customizable.

BACKGROUND OF THE INVENTION

Running out of fuel while driving a motor vehicle is a common occurrence. The essential problem is that many drivers inadvertently forget to observe when the fuel level gauge has reached the "empty" position. And even then it can occur when the driver is unaware how far the motor vehicle can travel at any given position of the fuel gauge, and the motor vehicle runs out of fuel between service stations.

To combat this issue, many motor vehicles are equipped with a fuel warning indicator that notifies the driver of the motor vehicle, typically with a light or sound, that the fuel tank is running low. While this solution has worked very satisfactorily, there is still room for improvement.

The distance a motor vehicle can travel without stopping to refill the fuel tank is dependent on the amount of fuel within the tank and the fuel economy of the motor vehicle. In order to calculate when an indicator should be activated, the typical fuel warning indicator uses an estimated fuel economy based on the type and class of the particular motor vehicle. However, this estimation does not take into account the actual fuel economy of the motor vehicle, which can be dependent on how and where the motor vehicle is driven. Moreover, the point in time at which the typical fuel warning indicator is activated is set by the manufacturer, and may be any particular distance to empty.

SUMMARY OF THE INVENTION

A customizable low fuel indicator system for a motor vehicle includes an engine control unit storing the average fuel economy of the motor vehicle. A fuel tank sensor is in electronic communication with the engine control unit and is adapted to sense the amount of fuel remaining in a fuel tank of the motor vehicle. An indicator is in electronic communication with the engine control unit. An input device is in communication with the electronic control unit for selecting a threshold distance to empty. The engine control unit calculates a distance to empty value based on the average fuel economy and the amount of fuel sensed by the fuel tank sensor. The indicator is activated by the engine control unit when the distance to empty is less than the threshold distance to empty.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
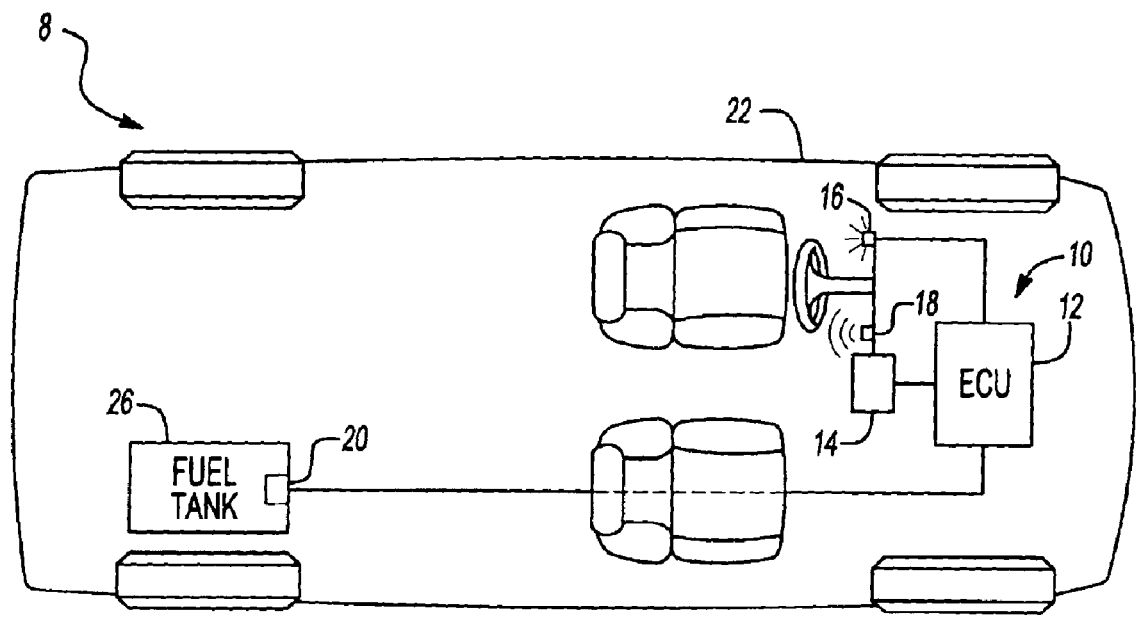
FIG. 1 is a schematic illustration of a motor vehicle having a low fuel indicator system constructed according to the principles of the present invention.

Referring to FIG. 1 of the drawings, a motor vehicle 8 is illustrated having a low fuel indicator system 10 constructed according to the principles of the present invention. Those skilled in the art will appreciate that the incorporation of the low fuel indicator system 10 into the motor vehicle 8 is merely exemplary in nature and that the low fuel indicator system 10 has applicability to various other environments, for example motor boats or aircraft.

The low fuel indicator system 10 generally includes an engine control unit 12, a trip computer 14, a visual indicator 16, an audible indicator 18, and a fuel tank sensor 20. The engine control unit 12 is a centralized controller that essentially controls the electromechanical and electronic mechanisms of the motor vehicle 8 according to pre-programmed instructions and driver input. In this regard, the engine control unit 12 is in communication with the powertrain (not shown) of the motor vehicle 8 as well as the various other components of the low fuel indicator system 10, as will be described below. Alternatively, the engine control unit 12 may be a body controller or any generic microprocessor controller.

The trip computer 14 is mounted within the dashboard 20 of the motor vehicle 8 so as to be easily accessible by an occupant of the motor vehicle 8. Alternatively, the trip computer 14 can be mounted within the roof (not shown) or center console (not shown) of the motor vehicle 8. The trip computer 14 is a microprocessor that includes a display (not shown) and input controls (not shown) linked to a microprocessor (not shown).

The visual indicator 16 is mounted within the dashboard 20 near the driver side of the motor vehicle 8 for indicating to the driver of the motor vehicle 8 when the fuel level is low. In the particular example provided, the indicator 20 is a light emitting diode (LED). However, various other light indicators may be employed, for example a candescent bulb.

The audible indicator 18 is mounted within the dashboard 22 and also indicates to the driver of the motor vehicle 8 when the fuel level is low. Alternatively, the audible indicator 18 may be mounted within the trip computer 14. The audible indicator 18 is preferably a conventional speaker that provides an audible sound, such as, for example, a bell sound. However, various other sound producing mechanisms and various other audible sounds may be employed.

The fuel sensor 20 is mounted within a fuel tank 26 of the motor vehicle. The fuel sensor 20 senses the amount of fuel (not shown) within the fuel tank 26 using conventional means.

Figure 2:
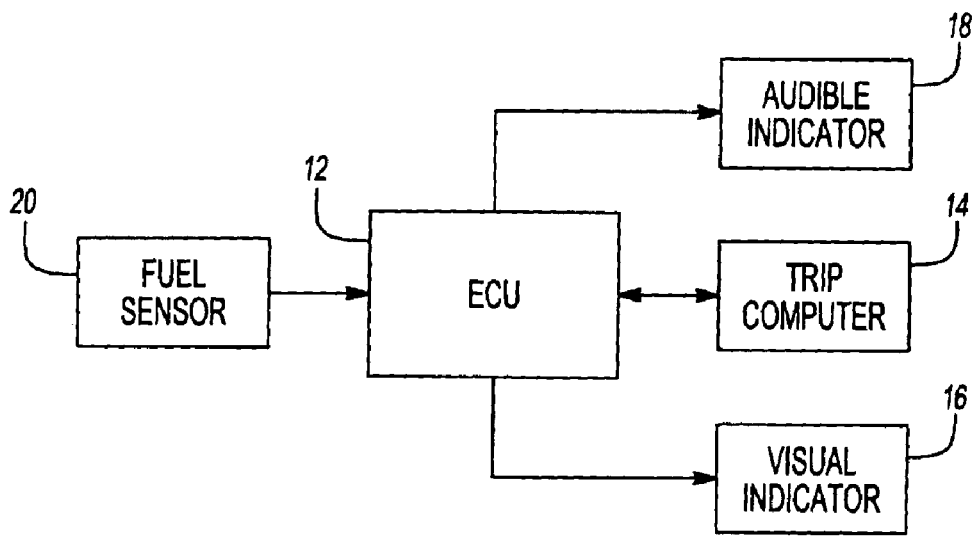
FIG. 2 is a schematic diagram of the control system for the low fuel indicator system of FIG. 1.

Turning to FIG. 2, the control schematic for the low fuel indicator system 10 is provided. As can be seen, the trip computer 14 is in two way electronic communication with the engine control unit 12. The microprocessor (not shown) within the trip computer 14 converts signals from the engine control unit 12 and displays them for the occupants. The microprocessor also converts input from the occupants into electronic signals and sends the signals to the engine control unit 12. The visual and audible indicators 16, 18 are in electronic communication with the engine control unit 12 and are activated by an electronic signal from the engine control unit 12. The fuel sensor 20 is in electronic communication with the engine control unit 12 and sends a signal to the engine control unit 12 providing the fuel level within the fuel tank 26.

Figure 3:
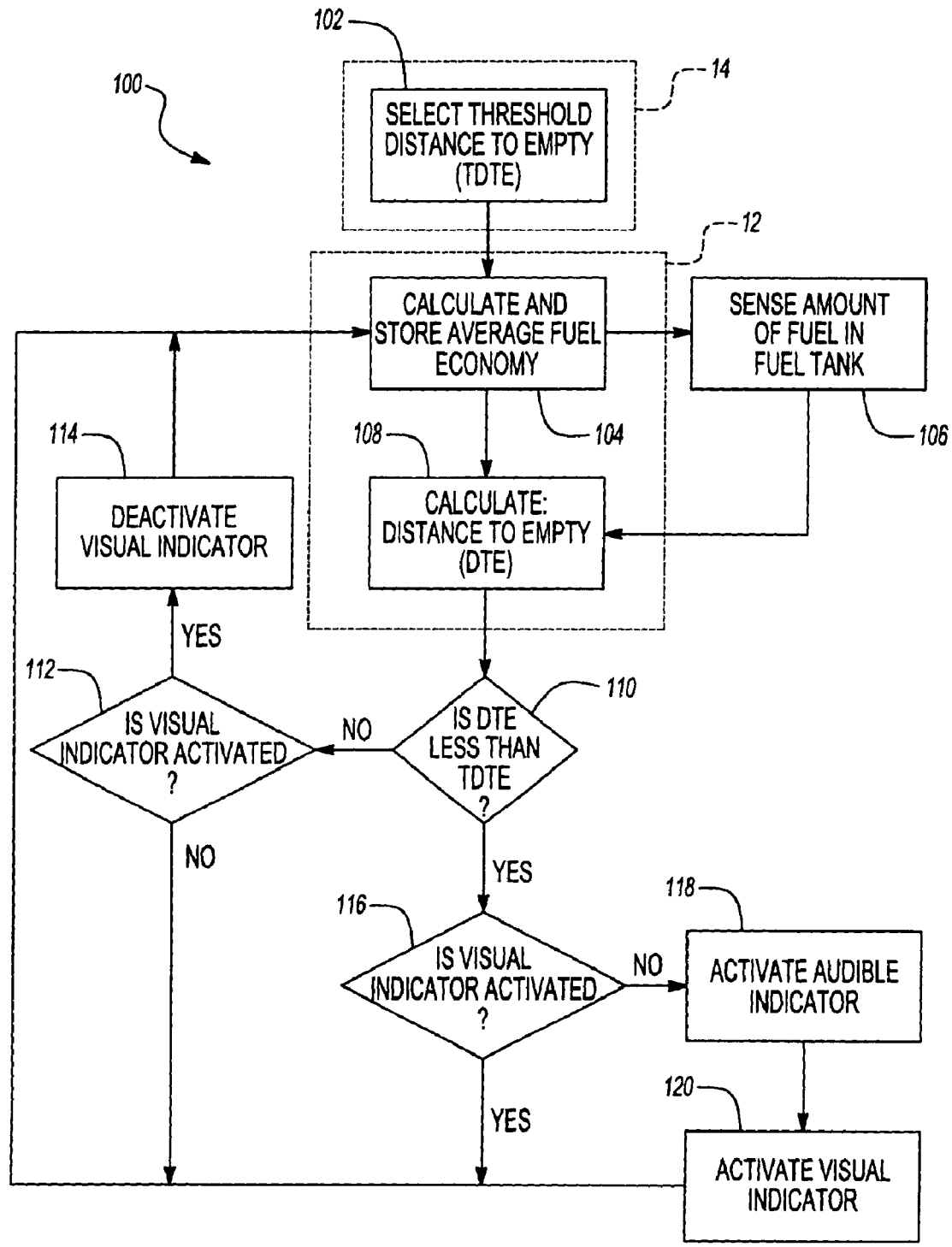
FIG. 3 is a flowchart illustrating a methodology for customizing the low fuel indicator system of claim 1.

With reference to FIG. 3, a method of customizing the low fuel indicator system 10 will now be described and is generally indicated by reference numeral 100. The method 100 begins when the occupant or driver of the motor vehicle 8 sets a Threshold Distance To Empty (TDTE) in the trip computer 14, shown at step 102. The TDTE is essentially at what time the driver wishes to be notified that the fuel tank 26 is nearing empty. The TDTE is expressed as the distance the motor vehicle 8 can travel before the fuel tank 26 is empty. Crossing the TDTE, as will be described below, will activate the visual and audible indicators 16, 18 thereby notifying the driver that the fuel tank 24 is low. In this regard, the driver selects the TDTE to correspond to the distance the driver wishes to be able to travel after the driver has been warned by the visual and audible indicators 16, 18. For example, if the driver wishes to be able to travel 60 miles after the visual indicator 16 has been activated, the driver may enter "60" as the TDTE (e.g. as the threshold distance).

During operation of the motor vehicle, the engine control unit 12 calculates and stores the Average Fuel Economy of the motor vehicle 8 at step 104. The Average Fuel Economy is an average over time of the distance traveled by the motor vehicle 8 per unit of consumed fuel. The Average Fuel Economy may be higher or lower depending on how and where the motor vehicle 8 is being driven (e.g. fast acceleration typically provides a lower Average Fuel Economy than slow acceleration, and driving on a highway provides a typically higher Average Fuel Economy than driving on a surface road).

The fuel sensor 20 next senses the amount of fuel within the fuel tank 26 at step 106. This information is submitted to the engine control unit 12. It should be noted that while step 106 is illustrated as being dependent on step 104, sensing the fuel is a continuous process that occurs simultaneously with other steps.

The engine control unit 12 then calculates a Distance To Empty (DTE) at step 108. The DTE is the calculated distance the motor vehicle 8 can be expected to travel before the fuel tank 26 is empty. The DTE is calculated using the current amount of fuel in the fuel tank 26 using the fuel sensor 20 at step 106. The Average Fuel Economy is then used to estimate the DTE. By taking into account the unique Average Fuel Economy of the motor vehicle 8, a more precise DTE can be calculated.

The DTE is then compared to the TDTE at step 110. If the DTE is greater than the TDTE (e.g. the motor vehicle 8 can travel farther than the distance the driver has selected as the threshold), then the method 100 proceeds to step 112. At step 112, if the visual indicator 16 is currently activated, then the visual indicator 16 is deactivated by the engine control unit 12 at step 114. This corresponds to the situation wherein the visual indicator 16 has been activated due to low fuel in the fuel tank 26, but due to a change in the fuel level (e.g. the tank has been filled) the DTE is no longer less than the TDTE. After the visual indicator 16 has been deactivated, the method 100 returns to step 104 and the method 100 repeats. At step 112, if the visual indicator 16 was not active, then the method 100 also returns to step 104 and repeats.

At step 110, if the DTE is less than or equal to the TDTE (e.g. the distance the motor vehicle 8 can travel is less than the threshold distance selected by the driver), then the method proceeds to step 116. At step 116, if the visual indicator 16 is currently activated, then the method 100 returns to step 104 and repeats. This corresponds to the situation wherein the driver is already being notified that the threshold distance has been passed since the visual indicator 16 has already been activated.

However, if at step 116 the visual indicator 16 is not currently activated, then at step 118 the engine control unit 12 activates the audible indicator 18 to indicate audibly that the threshold distance has been crossed. The audible indicator 18 is only activated once so as not to distract or harass the occupants of the motor vehicle 8. Then, at step 120, the visual indicator 16 is activated to further notify the driver that the motor vehicle 8 is low on fuel. The method 100 then returns to step 104 and repeats. The visual indicator 16 will stay activated until such time as the DTE of the motor vehicle 8 is greater than the TDTE.

By allowing the driver to customize when the indicators 16, 22 are activated, the low fuel indicator system 10 provides greater driver satisfaction. Moreover, using the actual average fuel economy of the motor vehicle 8, rather than an estimate, provides a more accurate estimation of the distance the motor vehicle 8 can travel before the fuel tank 22 is empty.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A customizable low fuel indicator system for a motor vehicle comprising:

a control unit for calculating and storing the average fuel economy of the motor vehicle;

a fuel tank sensor in electronic communication with the control unit and adapted to sense the amount of fuel remaining in a fuel tank of the motor vehicle;

an indicator in electronic communication with the control unit;

an input device in communication with the control unit for selecting a threshold distance to empty;

wherein the control unit calculates a distance to empty value based on the average fuel economy and the amount of fuel sensed by the fuel tank sensor; and wherein the indicator is activated by the control unit when the distance to empty is less than the threshold distance to empty.

2. The customizable low fuel indicator system of claim 1, wherein the indicator is a visual indicator adapted to be mounted within a dashboard of the motor vehicle.

3. The customizable low fuel indicator system of claim 2, wherein the visual indicator is a light emitting diode.

4. The customizable low fuel indicator system of claim 1, further comprising an audible indicator in communication with the control unit, the audible indicator activated by the control unit when the distance to empty is less than the threshold distance to empty.

5. The customizable low fuel indicator system of claim 1, wherein the input device is a trip computer.

6. A method for warning the driver of a motor vehicle when the fuel within the motor vehicle is running low based on a driver selected distance to empty, the method comprising:

selecting a threshold distance to empty;

calculating and storing an average fuel economy of the motor vehicle;

sensing the amount of fuel within the fuel tank of the motor vehicle;

calculating a distance the motor vehicle can travel until empty based on the average fuel economy and the amount of fuel; and activating an indicator if the distance to empty is less than the threshold distance to empty.

7. The method of claim 6, wherein the indicator is a visual indicator that emits light when activated.

8. The method of claim 7, further comprising activating an audible indicator if the distance to empty is less than the threshold distance to empty.

9. The method of claim 6, wherein the threshold distance to empty is selected through a trip computer in the motor vehicle.

* * * * *